United States Patent
Hu

(10) Patent No.: US 8,538,381 B2
(45) Date of Patent: Sep. 17, 2013

(54) SYSTEM, METHOD AND TERMINAL FOR FORWARDING INCOMING CALL

(75) Inventor: Qiulin Hu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/392,953

(22) PCT Filed: Jun. 8, 2010

(86) PCT No.: PCT/CN2010/073660
§ 371 (c)(1),
(2), (4) Date: Feb. 28, 2012

(87) PCT Pub. No.: WO2011/023015
PCT Pub. Date: Mar. 3, 2011

(65) Prior Publication Data
US 2012/0157054 A1 Jun. 21, 2012

(30) Foreign Application Priority Data
Aug. 31, 2009 (CN) .......................... 2009 1 0171828

(51) Int. Cl.
*H04M 1/66* (2006.01)
*H04M 1/68* (2006.01)
*H04M 3/16* (2006.01)

(52) U.S. Cl.
USPC ....................................................... 455/411

(58) Field of Classification Search
USPC ....................................................... 455/411
See application file for complete search history.

(56) References Cited

U.S. PATENT DOCUMENTS

| | | | |
|---|---|---|---|
| 7,031,704 B2 * | 4/2006 | Di Claudio et al. | 455/432.1 |
| 2004/0063451 A1 * | 4/2004 | Bonta et al. | 455/519 |
| 2007/0032230 A1 * | 2/2007 | Pregont | 455/421 |
| 2007/0259687 A1 * | 11/2007 | Huang et al. | 455/552.1 |
| 2007/0281735 A1 * | 12/2007 | Suzuki | 455/551 |

(Continued)

FOREIGN PATENT DOCUMENTS

| | | |
|---|---|---|
| CN | 1567960 A | 1/2005 |
| CN | 101159543 A | 4/2008 |

(Continued)

OTHER PUBLICATIONS

International Search Report for PCT/CN2010/073660 dated Jul. 16, 2010.

*Primary Examiner* — Nathan Mitchell
(74) *Attorney, Agent, or Firm* — Stephen Yang; Ling Wu; Ling and Yang Intellectual Property

(57) ABSTRACT

The present invention discloses a system, method and terminal for implementing the forwarding of incoming call, wherein the method comprises: a terminal A with Wireless LAN Authentication and Privacy Infrastructure (WAPI) function establishing a connection with another terminal B with the WAPI function through a WAPI module; when either the terminal A or terminal B has an incoming call, the terminal having the incoming call forwarding the incoming call to another terminal which has established the connection with the terminal having the incoming call. In the present invention, the incoming calls on the terminal A can be forwarded to the terminal B, and the phone calls on the terminal B also can be forwarded to the terminal A, which is convenient for users to answer the phone calls and can solve the phenomenon of the users missing calls due to various reasons very well.

9 Claims, 3 Drawing Sheets

(56) References Cited

U.S. PATENT DOCUMENTS

| | | | |
|---|---|---|---|
| 2008/0212572 A1* | 9/2008 | Toor et al. | 370/352 |
| 2008/0261528 A1* | 10/2008 | Rosenblatt | 455/41.3 |
| 2009/0300358 A1* | 12/2009 | Pang et al. | 713/171 |
| 2010/0009656 A1* | 1/2010 | Pang et al. | 455/410 |
| 2010/0268954 A1* | 10/2010 | Pang et al. | 713/171 |
| 2010/0293370 A1* | 11/2010 | Xiao et al. | 713/155 |
| 2011/0055561 A1* | 3/2011 | Lai et al. | 713/168 |
| 2011/0055569 A1* | 3/2011 | Zhang et al. | 713/170 |
| 2011/0302411 A1* | 12/2011 | Liang et al. | 713/158 |
| 2012/0096263 A1* | 4/2012 | Shi et al. | 713/168 |

FOREIGN PATENT DOCUMENTS

| | | |
|---|---|---|
| CN | 101282352 A | 10/2008 |
| CN | 101459984 A | 6/2009 |
| CN | 101483863 A | 7/2009 |
| CN | 101489203 A | 7/2009 |
| WO | 2006064360 A1 | 6/2006 |

* cited by examiner

SYSTEM, METHOD AND TERMINAL FOR FORWARDING INCOMING CALL

TECHNICAL FIELD

The present invention relates to the field of communication, and more especially, to a system, method and terminal for forwarding incoming call.

BACKGROUND OF THE RELATED ART

With the development of society, more and more users use the communication devices and means of communication also become more diversified, from the original fixed telephone to the current mobile phone, and the consumers of various industries and regions are involved. The mobile phone products greatly facilitate people's lives and make the communication become more convenient. Currently, the main advantage of mobile phone is the mobility, but the users usually put the mobile phones aside and then go to do something else when going home or going to some fixed places after work, thus a problem of missing calls due to failure to hear the ringing of incoming calls exists. Similarly, there is also a phenomenon of the consumers missing calls due to failure to hear the ringing of mobile phone in certain places at home.

"GBT 15629.11(1102)-2003" discloses a WLAN Authentication and Privacy Infrastructure (WAPI) which is composed of a WLAN Authentication Infrastructure (WAI) and a WLAN Privacy Infrastructure (WPI). The WAI is a basis for implementing the WAPI. With the WAI, in a BSS, when a STA associates or re-associates with an AP, an authentication with each other should be performed; if the authentication is completed, the AP allows for accessing of the STA. The whole authentication process includes a certification authentication, a unicast key negotiation and a broadcast key notification, which is shown in FIG. 4.

SUMMARY OF THE INVENTION

If two mobile phones located in a relatively close distance (e.g. in different rooms at home) are interconnected, and an incoming call of one party can be transferred to the mobile phone of the other party, thus a situation of missing calls will be greatly reduced. Therefore, the consumers can interconnect their mobile phones with the mobile phones of the family members after going home from work, so as to implement forwarding between the mobile phones.

The technical problem to be solved by the present invention is to provide a system, method and terminal for forwarding incoming call, which can implement the forwarding of incoming call between the terminals.

In order to solve the above technical problem, the present invention provides a method for forwarding incoming call, comprising:

a terminal A with Wireless LAN Authentication and Privacy Infrastructure (WAPI) function establishing a connection with another terminal B with the WAPI function through a WAPI module; and when either the terminal A or terminal B has an incoming call, the terminal having the incoming call forwarding the incoming call to the other terminal which has established the connection with the terminal having the incoming call.

Preferably, the step of the terminal A with the WAPI function establishing the connection with another terminal B with the WAPI function through the WAPI module comprises:

the terminal A searching out another terminal B with the WAPI function and then sending a connection request to the terminal B, which includes a WAPI address and connection password of the terminal A;

the terminal B returning a response message to the terminal A after receiving the connection request, which includes the connection password;

the terminal A judging whether the connection password therein is correct after receiving the response message, if correct, a connection establishment succeeding, otherwise the connection establishment failing.

Preferably, when either the terminal A or terminal B has an incoming call, the step of the terminal having the incoming call forwarding the incoming call to another terminal which has established the connection with the terminal having the incoming call comprises:

if the terminal A receives the incoming call, sending an address, a name and incoming call information of the terminal A through a WAPI protocol to the terminal B;

the terminal B judging whether received information is sent by the terminal which has established the connection, if yes, analyzing the received information and displaying at the current terminal, if no, discarding the received information.

Preferably, the address of the terminal is represented by six groups of hexadecimal arrays, the name is a model number of the terminal, and the incoming call information is represented by FF.

Preferably, in the step of the terminal having the incoming call forwarding the incoming call to another terminal which has established the connection with the terminal having the incoming call, before the incoming call is answered or hung up, the terminal A and the terminal B are both kept in an incoming call prompt state.

In order to solve the above technical problem, the present invention provides a system for forwarding incoming call, which comprises two or multiple terminals, wherein:

the terminal comprises a Wireless LAN Authentication and Privacy Infrastructure (WAPI) module;

the WAPI module is configured to: send a connection establishment request and establish a connection with another terminal with the WAPI module; and when a current terminal has an incoming call, forward the incoming call to the terminal which has established the connection with the current terminal.

Preferably, the terminal further comprises a main processor, and the system comprises a terminal A and a terminal B; wherein:

the main processor of the terminal A is configured to: notify the WAPI module of the terminal A to establish the connection when needing to establish the connection with another terminal B with the WAPI module; and judge whether a connection password is correct after receiving a response message of the terminal B, if correct, the connection with the terminal B succeeds, otherwise the connection with the terminal B fails;

the WAPI module of the terminal A is configured to: send the connection establishment request to the terminal B after receiving a notification for establishing the connection sent by the main processor of the terminal A, which includes a WAPI address and a connection password of the current terminal; and forward the received response message returned by the terminal B to the main processor of the terminal A;

the WAPI module of the terminal B is configured to: send the response message to the terminal which sends the connection establishment request after receiving the connection establishment request, wherein the response message includes the connection password.

Preferably, the terminal further comprises the main processor, and the system comprises the terminal A and the terminal B; wherein:

the main processor of the terminal A is configured to: notify the WAPI module of the terminal A to forward the incoming call to the terminal B which has established the connection with the terminal A after receiving the incoming call;

the WAPI module of the terminal A is configured to: forward incoming call related information to the terminal B through a WAPI protocol after receiving the notification for forwarding the incoming call, wherein the incoming call related information comprises an address, a name and incoming call information of the terminal A;

the WAPI module of the terminal B is configured to: forward the received incoming call related information to the main processor of the terminal B;

the main processor of the terminal B is configured to: after receiving the incoming call related information, judge whether the incoming call related information is sent by the terminal which has established the connection with the terminal B according to the address therein, and if yes, analyze the received information and send the received information to a Liquid Crystal Display (LCD) screen for display, if no, discard the received information.

Preferably, the address of the terminal is represented by six groups of hexadecimal arrays, the name is a model number of the terminal, and the incoming call information is represented by FF.

In order to solve the above technical problem, the present invention provides a terminal, comprising a Wireless LAN Authentication and Privacy Infrastructure (WAPI) module, wherein:

the WAPI module is configured to: send a connection establishment request and establish a connection with another terminal with the WAPI module; and when a current terminal has an incoming call, forward the incoming call to the terminal which has established the connection with the current terminal.

Preferably, the terminal further comprises a main processor, wherein:

the main processor is configured to: notify the WAPI module to establish the connection when needing to establish the connection with another terminal with the WAPI module; and judge whether a connection password is correct after receiving a response message of said another terminal, if correct, the connection with said another terminal succeeds, otherwise the connection with said another terminal fails;

the WAPI module is configured to: send the connection establishment request to said another terminal after receiving a notification for establishing the connection sent by the main processor, wherein the connection establishment request includes a WAPI address and connection password of the current terminal; and forward the received response message returned by said another terminal to the main processor; and send the response message to the terminal which sends the connection establishment request after receiving the connection establishment request, wherein the response message includes the connection password.

Preferably, the terminal further comprises the main processor, wherein:

the main processor is configured to: notify the WAPI module to forward the incoming call to said another terminal which has established the connection with the WAPI module after receiving the incoming call; and after receiving incoming call related information, judge whether the received incoming call related information is sent by the terminal which has established the connection with the WAPI module according to address therein, and if yes, analyze the received information and send the received information to a Liquid Crystal Display (LCD) screen for display, if no, discard the received information;

the WAPI module is configured to: forward the incoming call related information to said another terminal through a WAPI protocol after receiving a notification for forwarding the incoming call, wherein the incoming call related information comprises an address, a name and incoming call information of the current terminal; and forward the incoming call related information to the main processor when receiving the incoming call related information.

With the technical scheme of the present invention, the WAPI module inside the terminal can be utilized for interconnecting terminals to implement the forwarding of incoming call between the terminals. Thus, the incoming calls of the terminal A can be forwarded to the terminal B, and the incoming calls of the terminal B can also be forwarded to the terminal A, which is convenient for the users to answer the phone calls and can solve the phenomenon of the users missing calls due to various reasons very well. In addition, the present invention is a point-to-point connection between two WAPI devices without the participation of a WAPI hotspot, and the connection is also not required to be implemented through the Internet, therefore, it is not limited by a narrow scope of the hotspot layout.

PREFERRED EMBODIMENTS OF THE PRESENT INVENTION

In the present invention, two or more than two terminals are interconnected through a Wireless LAN Authentication and Privacy Infrastructure (WAPI) module of the terminal, thereby implementing the forwarding of incoming call between the terminals.

Figure 1:
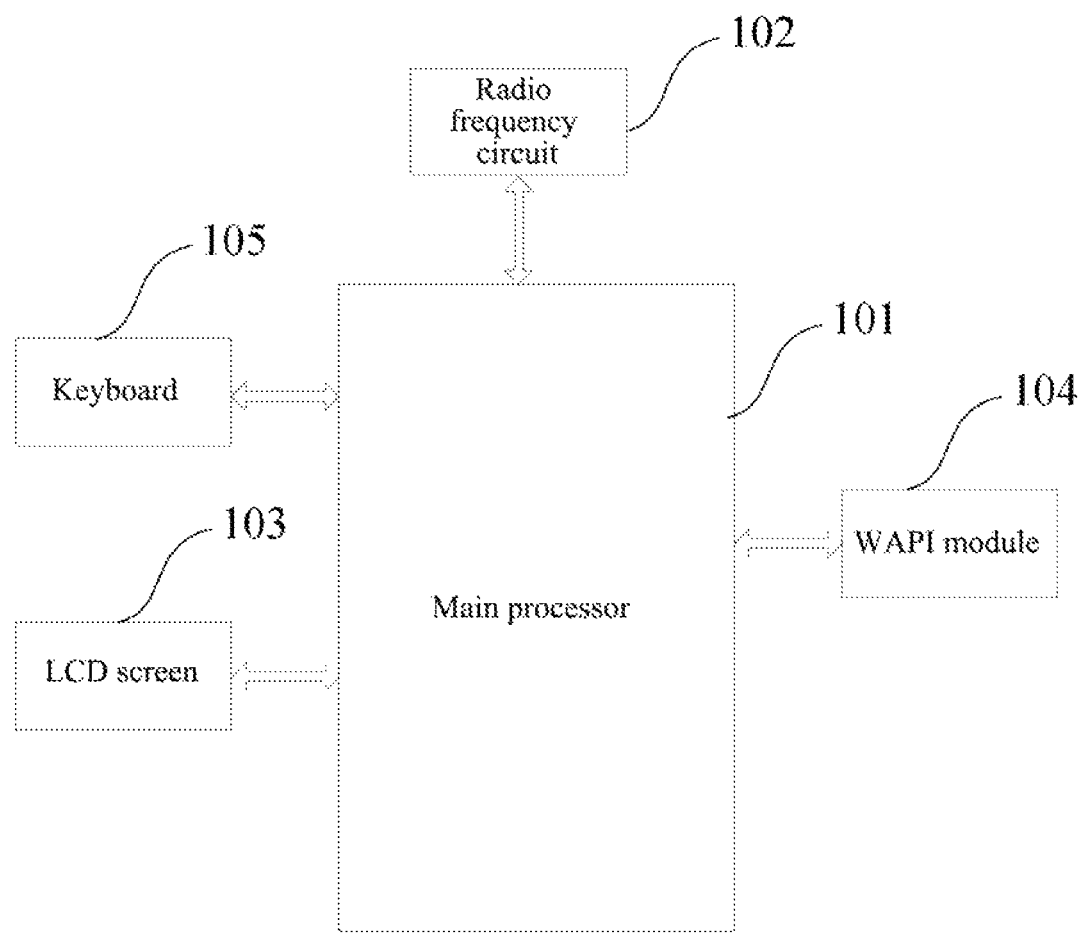
FIG. 1 is a structure diagram of the system according to the present invention.

The example provides a system for forwarding incoming call, wherein the system comprises two or multiple terminals; and as shown in FIG. 1, each terminal comprises a main processor 101, a radio frequency circuit 102, a Liquid Crystal Display (LCD) screen 103, a WAPI module 104 and a keyboard 105;

It is assumed that the terminal A sends a connection establishment request and establishes a connection with the terminal B:

the main processor of the terminal A is configured to: notify the WAPI module to establish the connection when needing to establish the connection with another terminal; and it is also configured to: judge whether a connection password is correct after receiving a response message, if correct, the connection with the terminal B succeeds, otherwise the connection with terminal B fails;

the WAPI module of the terminal A is configured to: send the connection establishment request after receiving the notification for establishing the connection sent by the main processor of the terminal A, wherein a WAPI address and connection password of the current terminal are included in the connection establishment request; and it is also configured to: forward the received response message returned by the terminal B to the main processor;

the WAPI module of the terminal B sends the response message to the terminal which sends the connection establishment request after receiving the connection establishment request, wherein the response message includes the above connection password.

It is assumed that the terminal A has an incoming call and forwards the incoming call to the terminal B:

the main processor of the terminal A notifies the WAPI module to forward the incoming call to the terminal B which has established the connection with the terminal A after receiving the incoming call;

the WAPI module of the terminal A forwards incoming call related information to the terminal B through a WAPI protocol after receiving the notification for forwarding the incoming call, wherein an address, a name and incoming call information of the terminal A are included;

the WAPI module of the terminal B forwards the received incoming call related information to the main processor;

the main processor of the terminal B judges whether the received information is sent by the terminal which has established the connection with the terminal B according to the address therein after receiving the incoming call related information, and if yes, the main processor of the terminal B analyzes the received information and sends the received information to LCD screen for display, if no, the main processor of the terminal B discards the information.

The LCD screen of the terminal B displays the information sent from the main processor.

Correspondingly, the terminal of the example of the present invention comprises a WAPI module 104 and a main processor 101, wherein:

the WAPI module 104 is configured to: send a connection establishment request and establish a connection with another terminal with the WAPI module; and when the current terminal has an incoming call, forward the incoming call to the terminal which has established the connection with the current terminal.

Preferably, the main processor 101 can be configured to: notify the WAPI module 104 to establish the connection when needing to establish the connection with another terminal with the WAPI module; and judge whether a connection password is correct after receiving a response message of another terminal, if correct, the connection with said another terminal succeeds, otherwise the connection with said another terminal fails; the WAPI module 104 can be configured to: send the connection establishment request to said another terminal after receiving the notification for establishing the connection sent by the main processor 101, wherein a WAPI address and connection password of the current terminal are included; and forward the received response message returned by said another terminal to the main processor 101; and send the response message to the terminal which sends the connection establishment request after receiving the connection establishment request, wherein the connection password is included.

Preferably, the main processor 101 can be configured to: notify the WAPI module 104 to forward the incoming call to another terminal which has established the connection with the WAPI module 104 after receiving the incoming call; and judge whether the incoming call related information is sent by the terminal which has established the connection with the WAPI module 104 according to the address therein after receiving the incoming call related information, if yes, analyze the received information and send the received information to LCD screen 103 for display, if no, discard the information; the WAPI module 104 can be configured to: forward the incoming call related information to said another terminal through a WAPI protocol after receiving the notification for forwarding the incoming call, wherein the incoming call related information comprises the address, name and incoming call information of the current terminal; and forward the received incoming call related information to the main processor 101.

Figure 2:
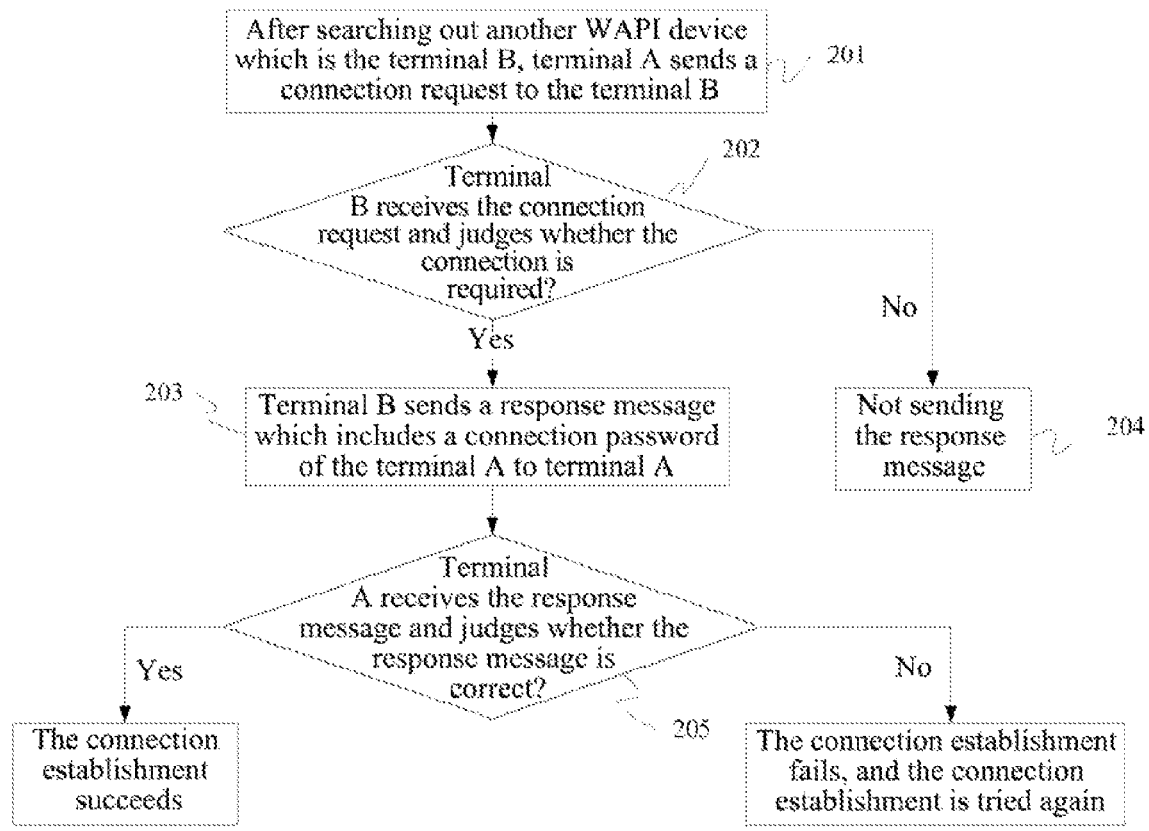
FIG. 2 is a flow chart of the example of method for establishing the connection between the terminal A and terminal B according to the present invention.

The example provides a method for forwarding incoming call, and as shown in FIG. 2, the following steps are included.

In step 201, when a terminal with a WAPI function is utilized to perform interconnection, a terminal A starts a WAPI function module and searches for a WAPI device under the current circumstance, and after searching out another terminal B, the terminal A sends a connection request (one WAPI address and connection password of the terminal A are attached) to the terminal B.

In step 202, the terminal B judges whether the connection is required according to the WAPI address after receiving the connection request, if yes, proceed to step 203, if no, proceed to step 204.

In step 203, if the terminal A is a device in its own list, a response message is sent to the terminal A, wherein the received connection password of the terminal A is included.

In step 204, if the requirement is not satisfied, such as the terminal A is not a device in its own list, the response message is not sent, and meanwhile, the software or user determines whether to shut down the WAPI module.

In step 205, the terminal A receives the response message and judges whether the response message is correct, if correct, the connection is successful and the information can be mutually transferred; if wrong, the terminal A tries to search for the terminal B again and sends the connection request.

If the terminal A doesn't receive the return information of the terminal B, it is probable that the terminal B doesn't hear the prompt tone and doesn't respond to the connection request, thus the terminal A can send the connection request again after waiting for a period of time until a set upper limit of times is reached.

Figure 3:
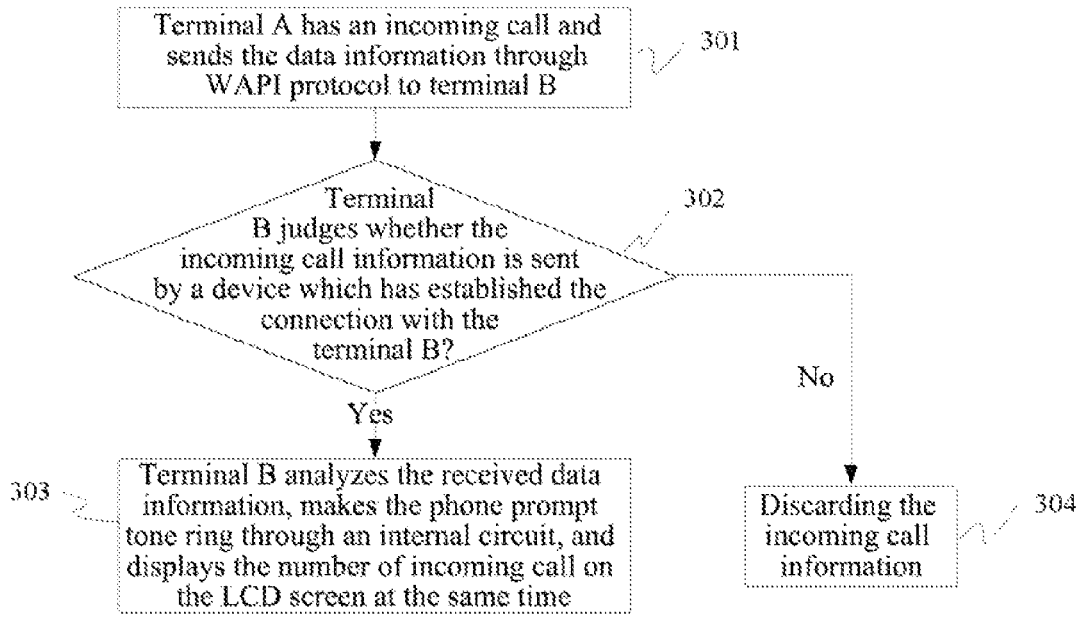
FIG. 3 is a flow chart of the example of method for implementing the forwarding of incoming call between the terminal A and terminal B according to the present invention.
Figure 4:
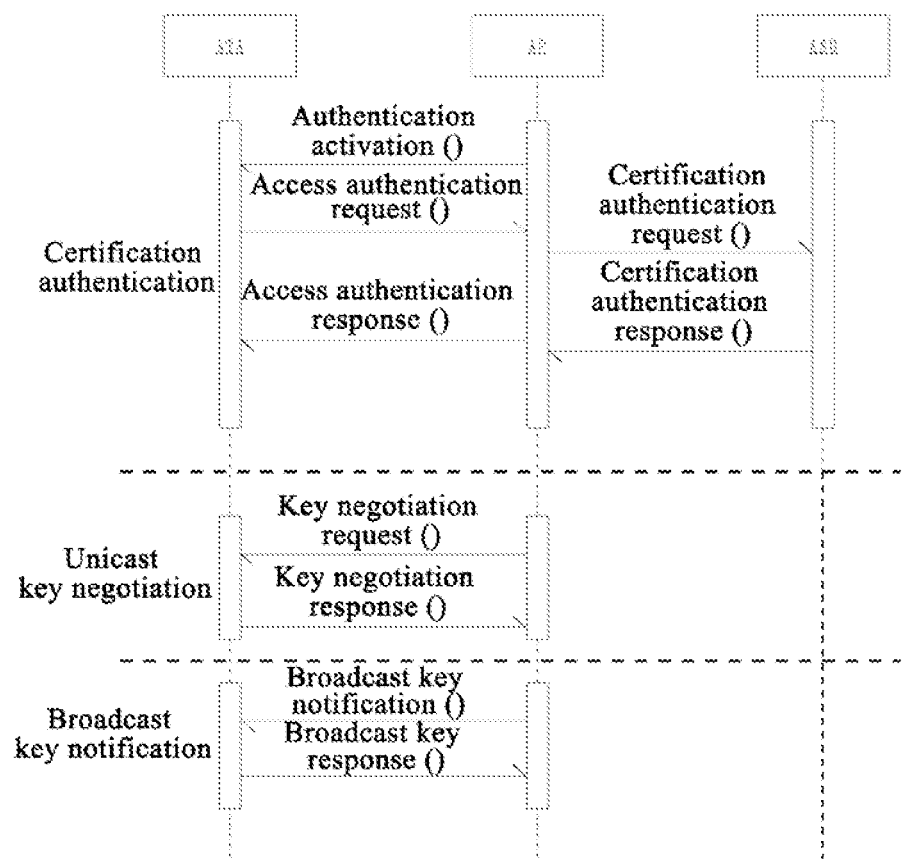
FIG. 4 is a flow chart of an STA accessing authentication in the prior art.

After the above connection is completed, two terminal devices can mutually forward the incoming call, and then the process of implementing the forwarding of incoming call is shown in FIG. 3, and the following steps are included.

In step 301, if a terminal A has an incoming call, on the one hand, the terminal A will make itself produce a ring through an internal hardware circuit to notify a user; on the other hand, the terminal A sends the data information, such as an address, name and incoming call information (the terminal address can be represented by six groups of hexadecimal arrays, the name can be the model number of the terminal, and the incoming call information can be represented by FF) of the current terminal, through WAPI protocol to the terminal B by an internal WAPI module;

In step 302, after receiving the incoming call information, the terminal B judges whether the information is sent by the device which has established the connection with the terminal B, if yes, proceed to step 303, otherwise proceed to step 304;

In step 303, the terminal B analyzes the received data information, makes the phone prompt tone ring through the internal circuit, and displays the number of incoming call on the LCD screen at the same time.

In step 304, if the information is not sent by the device which has established the connection with the terminal B, the incoming information is discarded.

Similarly, when having an incoming call, the terminal B can also forward the incoming call to the terminal A. The above incoming call includes the voice and short message and so on.

Before the incoming call is answered or hung up, the terminal A and the terminal B both can be kept in an incoming call prompt state (prompt modes such as ringing and/or vibration and so on are adopted, and the number of incoming call is displayed on the LCD screen). It also can be that, after the terminal A forwards the incoming call to the terminal B, the terminal B rings and/or vibrates and displays the number of incoming call on the LCD screen, and the terminal A isn't kept in the incoming call prompt state any more.

If using the terminal B to answer the incoming call, the voice data can be transmitted through the WAPI module between the terminal A and terminal B to implement a conversation. Specifically, the terminal A compresses the voice data received from the user of the opposite terminal and then sends it to the terminal B through the WAPI module; the terminal B receives the voice data sent by the terminal A, and compresses the voice data and then broadcasts it to the user of the current terminal; and compresses the voice data received from the user of the current terminal and then sends it to the terminal A through the WAPI module, and the terminal A forwards the voice data to the user of the opposite terminal.

The present invention is described in combination with the specific examples, however, the modifications and changes can be made without departing from the spirit and scope of the present invention for those skilled in the art. These modifications and changes are regarded to be within the scope of the present invention and the scope of the appended claims.

INDUSTRIAL APPLICABILITY

The present invention provides a system, method and terminal for implementing the forwarding of incoming call, and the WAPI module inside the terminal can be utilized for interconnecting terminals to implement the forwarding of incoming call between the terminals. Thus, the incoming calls on the terminal A can be forwarded to the terminal B, and the phone calls on the terminal B can also be forwarded to the terminal A, which is convenient for the users to answer the phone calls and can solve the phenomenon of the users missing calls due to various reasons very well.

What is claimed is:

1. A method for forwarding an incoming call, comprising:
a terminal A with Wireless LAN Authentication and Privacy Infrastructure (WAPI) function establishing a connection with another terminal B with the WAPI function through a WAPI module; and
when either the terminal A or terminal B has an incoming call, the terminal having the incoming call forwarding the incoming call, through the WAPI module, to the other terminal which has established the connection with the terminal having the incoming call;
wherein, the step of when either the terminal A or terminal B has an incoming call, the terminal having the incoming call forwarding the incoming call, through the WAPI module, to the other terminal which has established the connection with the terminal having the incoming call comprises:

if the terminal A receives the incoming call, sending an address, a name and incoming call information of the terminal A through a WAPI protocol to the terminal B;
the terminal B judging whether received information is sent by the terminal which has established the connection, if yes, analyzing the received information and displaying at the terminal B, if no, discarding the received information.

2. The method according to claim 1, wherein:
the step of the terminal A with the WAPI function establishing the connection with another terminal B with the WAPI function through the WAPI module comprises:
the terminal A searching out another terminal B with the WAPI function and then sending a connection request to the terminal B, wherein a WAPI address and a connection password of the terminal A are included;
the terminal B returning a response message to the terminal A after receiving the connection request, wherein the connection password is included;
the terminal A judging whether the connection password therein is correct after receiving the response message, if correct, a connection establishment succeeding, otherwise the connection establishment failing.

3. The method according to claim 1, wherein:
the address of the terminal is represented by six groups of hexadecimal arrays, the name is a model number of the terminal, and the incoming call information is represented by FF.

4. The method according to claim 1, wherein:
in the step of the terminal having the incoming call forwarding the incoming call to the other terminal which has established the connection with the terminal having the incoming call,
before the incoming call is answered or hung up, the terminal A and the terminal B are both kept in an incoming call prompt state.

5. A system for forwarding an incoming call, comprising two or multiple terminals, wherein:
the terminal comprises a Wireless LAN Authentication and Privacy Infrastructure (WAPI) module;
the WAPI module is configured to: send a connection establishment request and establish a connection with another terminal with the WAPI module; and when a current terminal has an incoming call, forward the incoming call to the terminal which has established the connection with the current terminal;
the terminal further comprises a main processor, the system comprising a terminal A and a terminal B; wherein:
the main processor of the terminal A is configured to: notify the WAPI module of the terminal A to forward an incoming call to the terminal B which has established the connection with the terminal A after receiving the incoming call;
the WAPI module of the terminal A is configured to: forward incoming call related information to the terminal B through a WAPI protocol after receiving a notification for forwarding the incoming call, wherein the incoming call related information comprises an address, a name and incoming call information of the terminal A;
the WAPI module of the terminal B is configured to: forward the received incoming call related information to the main processor of the terminal B;
the main processor of the terminal B is configured to: after receiving the incoming call related information, judge whether received information is sent by the terminal which has established the connection with the terminal B according to the address therein, and if yes, analyze the received information and send the received information to a Liquid Crystal Display (LCD) screen for display, if no, discard the received information.

6. The system according to claim 5, the terminal further comprising a main processor, and the system comprising a terminal A and a terminal B; wherein:
the main processor of the terminal A is configured to: notify the WAPI module of the terminal A to establish the connection when needing to establish the connection with another terminal B with the WAPI module; and judge whether a connection password is correct after receiving a response message of the terminal B, if correct, the connection with the terminal B succeeds, otherwise the connection with the terminal B fails;
the WAPI module of the terminal A is configured to: send the connection establishment request to the terminal B after receiving a notification for establishing the connection sent by the main processor of the terminal A, wherein a WAPI address and connection password of current terminal are included; and forward the received response message returned by the terminal B to the main processor of the terminal A;
the WAPI module of the terminal B is configured to: send the response message to a terminal which sends the connection establishment request after receiving the connection establishment request, wherein the connection password is included.

7. The system according to claim 5, wherein:
the address of the terminal is represented by six groups of hexadecimal arrays, the name is a model number of the terminal, and the incoming call information is represented by FF.

8. A terminal, comprising a Wireless LAN Authentication and Privacy Infrastructure (WAPI) module, wherein:
the WAPI module is configured to: send a connection establishment request and establish a connection with another terminal with the WAPI module; and when a current terminal has an incoming call, forward the incoming call to the terminal which has established the connection with the current terminal;
the terminal further comprises a main processor, wherein:
the main processor is configured to: notify the WAPI module to forward an incoming call to another terminal which has established the connection with the WAPI module after receiving the incoming call; and after receiving incoming call related information, judge whether the received information is sent by the terminal which has established the connection with the WAPI module according to address therein, if yes, analyze the received information and send the received information to a Liquid Crystal Display (LCD) screen for display, if no, discard the received information;
the WAPI module is configured to: forward the incoming call related information to said another terminal through a WAPI protocol after receiving a notification for forwarding the incoming call, wherein the incoming call related information comprises an address, a name and incoming call information of the current terminal; and forward the received incoming call related information to the main processor.

9. The terminal according to claim 8, further comprising a main processor, wherein:
the main processor is configured to: notify the WAPI module to establish the connection when needing to establish the connection with another terminal with the WAPI module; and judge whether a connection password is correct after receiving a response message of said another terminal, if correct, the connection with said another terminal succeeds, otherwise the connection with said another terminal fails;
the WAPI module is configured to: send the connection establishment request to said another terminal after receiving a notification for establishing the connection sent by the main processor, wherein a WAPI address and connection password of the current terminal are included; and forward the received response message returned by said another terminal to the main processor; and send the response message to a terminal which sends the connection establishment request after receiving the connection establishment request, wherein the connection password is included.

* * * * *